United States Patent
Nelson et al.

(10) Patent No.: US 9,651,341 B2
(45) Date of Patent: May 16, 2017

(54) SYSTEM FOR THE DETECTION AND CLASSIFICATION OF BURIED UNEXPLODED ORDNANCE

(71) Applicant: Herbert H. Nelson, Washington, DC (US)

(72) Inventors: Herbert H. Nelson, Washington, DC (US); Daniel A. Steinhurst, Alexandria, VA (US); Glenn R. Harbaugh, King George, VA (US); Thomas H. Bell, Adamstown, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 499 days.

(21) Appl. No.: 14/201,529

(22) Filed: Mar. 7, 2014

(65) Prior Publication Data

US 2016/0245623 A1    Aug. 25, 2016

Related U.S. Application Data

(60) Provisional application No. 61/783,051, filed on Mar. 14, 2013.

(51) Int. Cl.
*G01V 3/10* (2006.01)
*G01V 3/08* (2006.01)
(Continued)

(52) U.S. Cl.
CPC .......... *F41H 11/136* (2013.01); *G01V 3/104* (2013.01); *G01V 3/17* (2013.01); *G01V 3/12* (2013.01)

(58) Field of Classification Search
CPC . G01V 3/15; G01V 3/16; G01V 3/165; G01V 3/00
(Continued)

(56) References Cited

U.S. PATENT DOCUMENTS

| 4,945,305 A | * | 7/1990 | Blood | F41G 3/225 |
| | | | | 324/207.11 |
| 5,650,725 A | * | 7/1997 | Powell | G01V 3/15 |
| | | | | 324/326 |

(Continued)

OTHER PUBLICATIONS

PCT/US2014/022074 Written Opinion of The International Searching Authority, Jun. 19, 2014.*

(Continued)

*Primary Examiner* — Jermele M Hollington
*Assistant Examiner* — Sean Curtis
(74) *Attorney, Agent, or Firm* — U.S. Naval Research Laboratory; William Ladd

(57) ABSTRACT

A sensor system for detecting buried metal objects such as unexploded ordnance and the collection of data for the classification of the detected objects based on parameters extracted from the collected data includes a wheeled cart, positioned on which is an array of transmitter coils for transmitting a series of excitation signals onto the area of interest and a sensor array of receiver coils and preamplifiers for receiving back the resultant eddy current decays emitted by the buried objects, a computer, and data acquisition electronics for acquiring and storing the received decays as decay data within the computer. The incoming EMI data are digitized and a data fitting process is performed to extract fit location and shape parameters. These data can be transferred to other data analysis systems for comparison to previously recorded signatures to determine whether the received decay data from the area of interest is attributable to buried metal objects or conversely to an object constituting an anomaly.

20 Claims, 6 Drawing Sheets

(51) Int. Cl.
*F41H 11/136* (2011.01)
*G01V 3/17* (2006.01)
*G01V 3/12* (2006.01)

(58) Field of Classification Search
USPC .................................... 324/326–329; 702/38
See application file for complete search history.

(56) References Cited

U.S. PATENT DOCUMENTS

| | | | | |
|---|---|---|---|---|
| 6,064,209 A * | 5/2000 | Banerjee | G01V 3/15 324/329 |
| 6,084,412 A * | 7/2000 | Guo | G01V 3/12 324/239 |
| 6,104,193 A * | 8/2000 | Bell | G01V 3/104 324/329 |
| 6,216,540 B1 * | 4/2001 | Nelson | A61B 5/0091 73/633 |
| 6,600,320 B2 * | 7/2003 | Guo | G01V 3/12 324/329 |
| 6,791,329 B2 * | 9/2004 | Nelson | G01V 3/15 324/329 |
| 6,853,194 B2 * | 2/2005 | Nelson | G01V 3/104 324/329 |
| 6,967,574 B1 * | 11/2005 | Nelson | F41H 11/136 324/228 |
| 7,030,759 B2 * | 4/2006 | Nelson | G01V 3/15 340/551 |
| 7,414,404 B2 * | 8/2008 | Keene | G01V 3/107 324/243 |
| 7,994,963 B1 * | 8/2011 | Sternberg | G01V 3/104 342/192 |
| 7,999,550 B2 * | 8/2011 | Morrison | G01V 3/104 324/326 |
| 2002/0030492 A1 * | 3/2002 | Guo | G01V 3/12 324/334 |
| 2003/0016131 A1 * | 1/2003 | Nelson | G01V 3/15 340/551 |
| 2003/0034778 A1 * | 2/2003 | Nelson | G01V 3/15 324/329 |
| 2003/0052684 A1 * | 3/2003 | Nelson | G01V 3/104 324/329 |
| 2004/0260174 A1 * | 12/2004 | Keene | G01V 3/107 600/424 |
| 2005/0253711 A1 * | 11/2005 | Nelson | F41H 11/136 340/552 |
| 2010/0277358 A1 * | 11/2010 | Duvoisin, III | G01D 1/00 342/22 |

OTHER PUBLICATIONS

Steinhurst et al., A high power EMI sensor for detecting and classifying small and deep targets, SPIE 2016.*
Geonics Limited, Metal Detectors, Jul. 2013.*
Geonics Limited, Electromagnetic Geonics EM-61 MK2A, http://www.expins.com/item/geonics-em-61-mk2-a, Jul. 2013.*
Geometries, MetalMapper, Geometrics.com, Feb. 2010.*
Geometries, MetalMapper 2×2, Geometrics.com, 2016.*
Becker et al., A multisensor systesm for the detection and characterization of UXO, Jun. 1, 2006. Lawrence Berkeley National Laboratory.*

* cited by examiner

SYSTEM FOR THE DETECTION AND CLASSIFICATION OF BURIED UNEXPLODED ORDNANCE

CROSS-REFERENCE TO RELATED APPLICATIONS

This Application claims the benefit of U.S. Provisional Application 61/783,051 filed on Mar. 14, 2013, and incorporated herein by reference.

FIELD OF THE INVENTION

The invention is directed to a system for the detection of buried metal objects and the classification of the detected objects on the basis of shape parameters extracted from the modeling of the collected data, and more particularly to a system for distinguishing potentially hazardous buried unexploded ordnance (UXO) from non-hazardous scrap and range debris.

BACKGROUND OF THE INVENTION

UXO contamination at former and current Department of Defense (DOD) sites is an extensive problem. Site characterization and remediation activities conducted with the current state-of-the-art technologies at these sites often yield unsatisfactory results and are extremely expensive to implement. This is due in part to the inability of current technology to distinguish between UXO and nonhazardous items.

Present systems that are commercially available include the Geonics EM61-MK2, which although field-tested over many years only provides detection, not classification of UXO. The system also has undesirably large sensor dimensions, and suffers from signal response drift due to its analog electronic design. Another system is the Geometries MetalMapper, which is used in a vehicle-mounted configuration due to its large size and weight. In survey mode, it can only provide detection because the single transmitter only allows for the collection of a limited data set. In cued, or static mode, UXO classification is possible.

BRIEF SUMMARY OF THE INVENTION

According to the invention, a sensor system for detecting buried metal objects such as unexploded ordnance and the collection of data for the classification of the detected objects based on parameters extracted from the collected data includes a wheeled cart, positioned on which is an array of transmitter coils for transmitting a series of excitation signals onto the area of interest and a sensor array of receiver coils and preamplifiers for receiving back the resultant eddy current decays emitted by the buried objects, a computer, and data acquisition electronics for acquiring and storing the received decays as decay data within the computer. The incoming EMI data are digitized and a data fitting process is performed to extract fit location and shape parameters. These data can be transferred to other data analysis systems for comparison to previously recorded signatures to determine whether the received decay data from the area of interest are attributable to a metal object or empty soil or space.

Its electromagnetic induction (EMI) sensor capability robustly distinguishes between UXO and nonhazardous items.

The TEMTADS (the "Time-domain Electro-Magnetic MTADS—the "MTADS" acronym stands for Multi-sensor Towed Array Detection System") MP 2×2 Cart (MP System) provides robust UXO/Clutter classification performance in a form factor suitable for use in rugged terrain and other environments where mobility is limited. The system operates one of two modes: In a dynamic data collection mode, a wide area is interrogated to detect metallic objects and potentially classify some fraction of them from the resulting data; and in a cued, or static, data collection mode to support making UXO/Clutter decisions.

Based on the success of the MP System in cued mode, we have explored operating the system in a dynamic, or survey mode for anomaly detection. Anomaly detection performance was found to be comparable to that of the state-of-the-art in terms of Signal-to-Noise Ratio (SNR) and demonstrated improved spatial resolution in the resultant data. Preliminary classification results indicate that at least half of the detected anomalies could be successfully classified from the dynamic data alone, potentially reducing the number anomalies requiring cued data collection.

The invention provides UXO detection and classification capabilities, including in difficult terrain and treed areas. Daily production data collection rates of 1 acre for dynamic survey and 200 anomalies for cued mode are typically achieved, respectively. The system is 80 cm on a side and mounted on a man-portable cart. Relatively small sensors mitigate the problems of data processing/analysis when more than one target appearing under the system at one time.

DETAILED DESCRIPTION OF THE INVENTION

Figure 1:
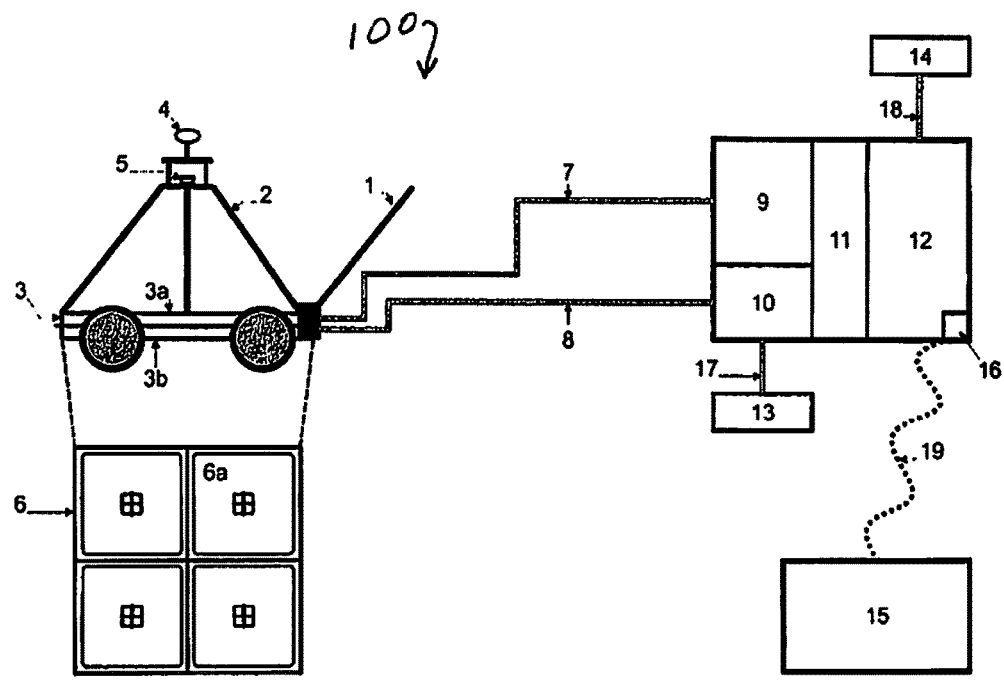
FIG. 1 is a schematic diagram of a system for the detection and classification of buried unexploded ordnance according to the invention.

Referring now to FIG. 1, system 100 includes a wheeled cart 1 (with a handle for pushing by an operator) mounted on which is a GPS (global positioning system)/IMU (inertial measurement unit) tripod 2 and a sensor bed 3 comprising an upper sensor shell 3*a* and a lower shell 3*b*. Positioned on tripod 2 are a GPS antenna and receiver for providing the location of the cart 4 (e.g. latitude, longitude, and elevation) and an IMU 5 for providing the orientation of the cart (e.g. Pitch, Roll, and Yaw). A sensor array 6 is sandwiched in between the two parts of the sensor bed 3 and includes TEMTADS/3D sensor 6*a*. A receiver cable 7 is attached at a first end to each receiver part of sensor 6*a* of sensor array 6 and at a second end to a receiver electronics 9. A transmitter cable 8 is attached at a first end to each transmitter portion of sensor 6*a* of sensor array 6 and at a second end to a transmitter electronics 10. Data acquisition electronics 11 acquires the received data and inputs the data to a computer 12. Power for the transmitter electronics 10 is provided by a transmitter battery 13 and the computer 12 has its own power source in computer battery 14.

System 100 further includes a control tablet computer 15, a wireless communications hub 16, a transmitter battery cable 17, a computer battery cable 18, and a wireless communications link 19.

Figure 2:
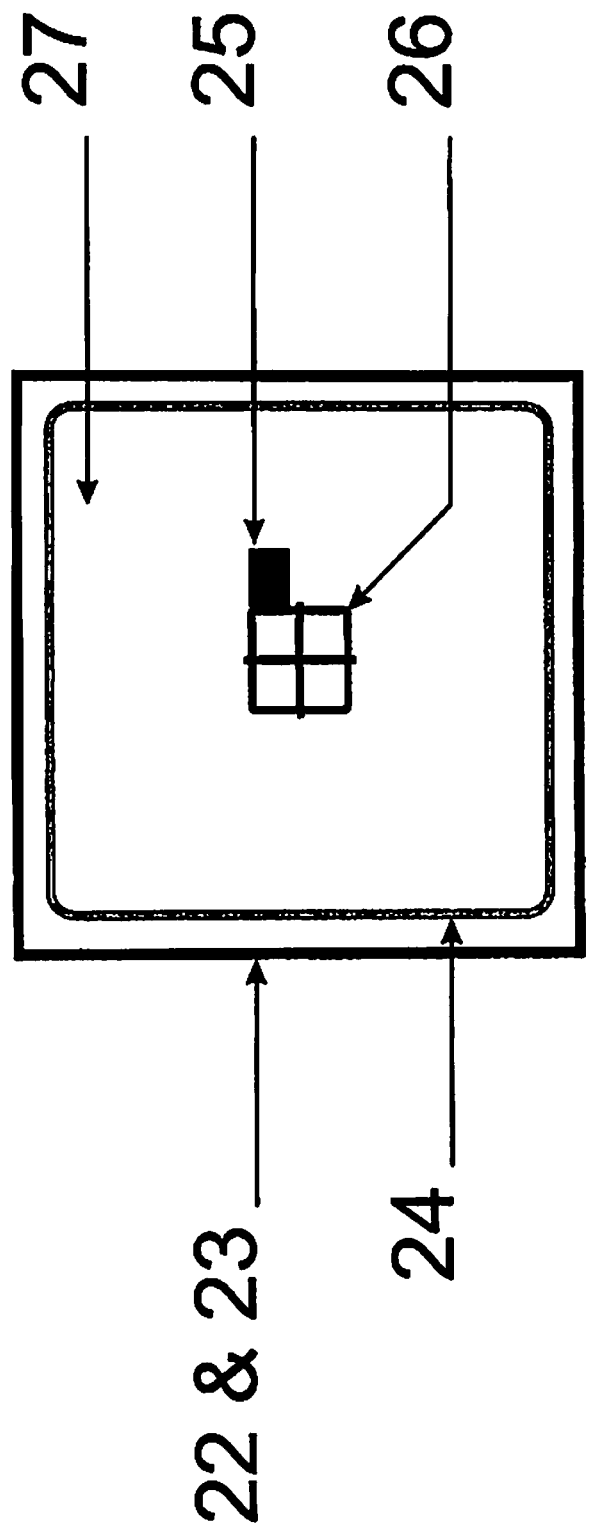
FIG. 2 is an individual TEMTADS/3D EMI sensor according to the invention.
Figure 3:
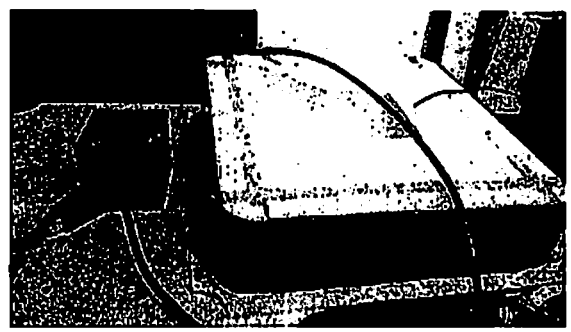
FIG. 3 is an individual TEMTADS/3D EMI sensor with 3 axis receiver under construction according to the invention.

The Time-Domain Electromagnetic Induction (TEM) TEMTADS/3D EMI sensor 6a is composed of a 35-cm square transmitter coil 20 with a three-axis receiver cube 21 placed in the center of the transmitter coil. These receiver cubes are similar in design to those used in the second-generation AOL developed by G&G Sciences for the U.S. Navy and in the Geometries MetalMapper (ESTCP MR-200603) system with dimensions of 8 cm rather than 10 cm. The U.S. Army Cold Regions Research and Engineering Laboratory's (CRREL) MPV2 system (ESTCP MR-201005) uses an array of five identical receiver cubes and a circular transmitter coil. The 8-cm tall transmitter coil is wound on a foam core in a solenoid configuration. The receiver cube for the TEMTADS/3D sensor is based on the receiver cube design used in G&G Sciences TEM sensor systems and in the Geometries MetalMapper system, which are typically 10 cm on a side. The dimensions of the TEMTADS/3D receiver cube are 8 cm to match the height of the transmitter coil to simplify packaging. FIG. 2 illustrates in more detail a sensor 6a comprising upper and lower cover plates 22 and 23 respectively, transmitter coil 24 signal preamplifier 25 receiver coils 26 and foam core 27. A TEMTADS/3D coil under construction is shown in FIG. 3.

Decay data are collected with a 500 kHz sample rate until 25 ms after turn off of the excitation pulse. A raw decay consists of 12,500 points; too many to be used practically. These raw decay measurements are grouped into a number of logarithmically-spaced "gates" with center times ranging from 25 μs to 24.375 ms and the binned values are saved to disk, that is, to computer and/or processor memory as is further discussed below. In cued mode, the decay measurements are grouped into 122 logarithmically-spaced "gates". In dynamic mode, the decay measurements are grouped into 19 gates with center times out to 2.78 ms.

TEMTADS MP 2×2 Cart

Figure 4:
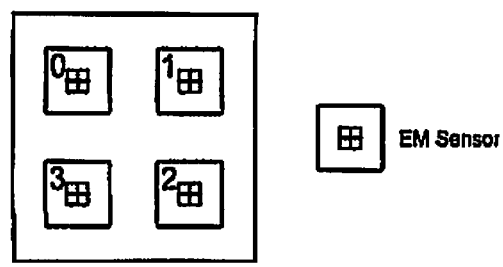
FIG. 4 is a schematic diagram of the EMI sensor array according to the invention showing the relative positions of the four tri-axial EMI sensors.
Figure 5:
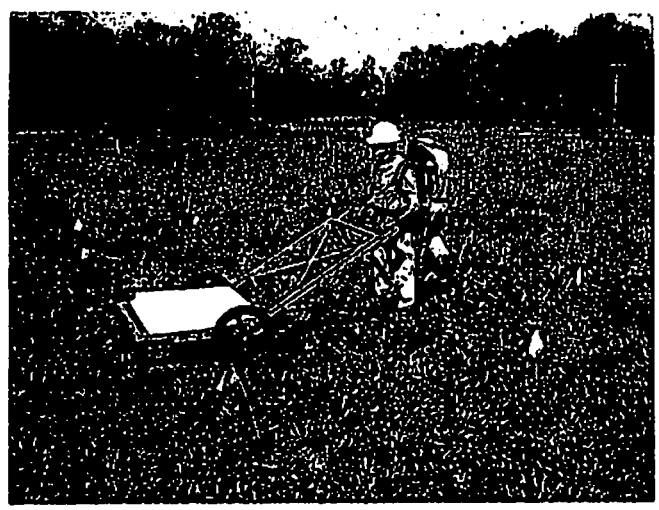
FIG. 5 is a picture showing the field-deployed TEMTADS Man-Portable 2×2 Cart according to the invention.
Figure 6:
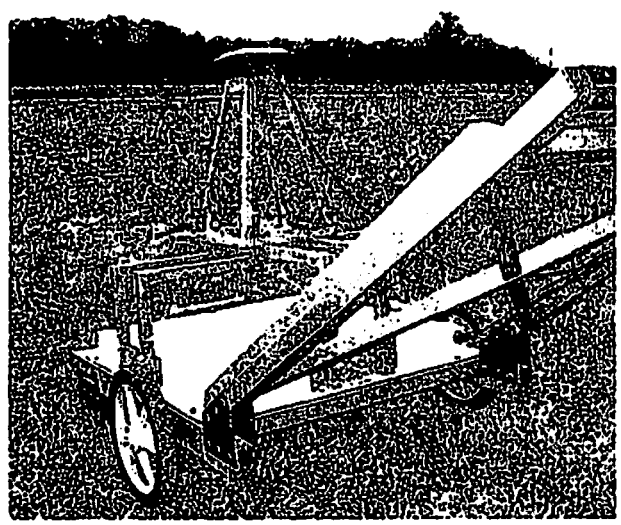
FIG. 6 is a picture showing the field-deployed TEMTADS MP 2×2 Cart with an onboard GPS Antenna Tripod according to the invention.

The MP System is a man-portable system comprised of four of the TEMTADS/3D EMI sensors arranged in a 2×2 array as shown schematically in FIG. 4. The MP System, shown in FIG. 5 at Aberdeen Proving Ground, Md., is fabricated from polyvinyl chloride (PVC) plastic and G-10 fiberglass. The center-to-center distance is 40 cm yielding an 80 cm×80 cm array. The array is deployed on a set of wheels resulting in a sensor-to-ground offset of approximately 20 cm. The MP System can be operated in two modes; dynamic or survey mode and cued mode. A GPS antenna and an IMU are mounted above the TEM array as shown in FIG. 6.

Application of this technology is straightforward. A dynamic survey of the system is used to generate a list of anomaly locations. The data collected in the dynamic survey will be of sufficient quality to classify some fraction of the anomalies based on the extracted fit shape parameters and comparison to previously recorded signatures. Flags are manually placed over each remaining anomaly location in advance using cm-level GPS or equivalent. In cued mode, the system is positioned over each target in turn. The transmitters for each array sensor are then fired in sequence, and decay data are collected from all receive coils for each excitation. These data are then stored electronically on the data acquisition computer. A few seconds of platform position and orientation data are collected at the beginning of the EMI data collection. The inverted position determined for each anomaly is initially relative to the array center. The recorded position and orientation data are used to translate the local position into absolute position and orientation. Prior to moving to the next anomaly, the operator evaluates several pieces of information for quality control purposes. The transmit current for each transmitter is compared to established thresholds. A display of the monostatic signal decays for each sensor is reviewed. Additionally, the data can be modeled in the field to determine that the system was accurately placed over the anomaly.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims. It is further noted that the processing and/or storage of data, e.g. received decay data associated with buried unexploded ordnance or other objects, can be accomplished by executing one or more sequences of one or more computer-readable instructions read into a memory of one or more computers from volatile or non-volatile computer-readable media capable of storing and/or transferring computer programs or computer-readable instructions for execution by one or more computers. Volatile computer readable media that can be used can include a compact disk, hard disk, floppy disk, tape, magneto-optical disk, PROM (EPROM, EEPROM, flash EPROM), DRAM, SRAM, SDRAM, or any other magnetic medium; punch card, paper tape, or any other physical medium. Non-volatile media can include a memory such as a dynamic memory in a computer. In addition, computer readable media that can be used to store and/or transmit instructions for carrying out methods described herein can include non-physical media such as an electromagnetic carrier wave, acoustic wave, or light wave such as those generated during radio wave and infrared data communications.

What is claimed as new and desired to be protected by Letters Patent of the United States is:

1. A sensor system, comprising:
  a wheeled cart;
  an array of transmitter coils positioned onboard the wheeled cart for transmitting a series of excitation signals onto an area of interest;
  a three-axis receiver cube, positioned in the center of a transmitter coil in the array of transmitter coils;
  a sensor array of receiver coils and preamplifiers for receiving back the resultant eddy current decays emitted by a plurality of buried objects;
  data acquisition electronics configured to acquire and store the received decays as decay data; and
  a computer configured to:
    operate electromagnetic inductions (EMI) transmitters and receivers,
    digitize incoming EMI data corresponding to the plurality of buried objects,
    perform, using the sensor array of receiver coils and the array of transmitter coils, a data fitting process on the EMI data,
    extract shape parameters from the EMI data based on the data fitting process,
    initiate a comparison of the shape parameters to a plurality of previously recorded signatures of known metallic objects, and
    determine, based on the comparison, whether to classify a buried object in the plurality of buried objects as a known metallic object corresponding to a signature in the plurality of previously recorded signatures.

2. The system of claim 1, wherein the sensor array comprises four electromagnetic induction sensors, each containing one or more transmitter, receiver coils, and signal preamplifier.

3. The system of claim 1, further comprising an onboard GPS antenna and receiver for providing the location of the cart.

4. The system of claim 3, further comprising an onboard inertial measurement unit for providing the orientation of the cart.

5. The system of claim 1, further comprising a first battery to power the transmitter and a second battery to power the computer.

6. The system of claim 1, further comprising a wireless communications hub.

7. A method, comprising:
receiving, using an electromagnetic induction (EMI) sensor array, EMI data corresponding to a plurality of buried objects;
extracting shape parameters from the EMI data,
initiating a comparison of the shape parameters to a plurality of previously recorded signatures of known metallic objects, and
determining, based on the comparison, whether to classify a buried object in the plurality of buried objects as a known metallic object corresponding to a signature in the plurality of previously recorded signatures.

8. The method of claim 7, wherein the sensor array is capable of distinguishing unexploded ordinance from other buried objects.

9. The method of claim 7, further comprising mapping GPS coordinates of interest in the area of interest.

10. The method of claim 9, further comprising utilizing an onboard inertial guidance unit when mapping the GPS coordinates.

11. A sensor system, comprising:
a sensor array capable of generating electromagnetic induction (EMI) data corresponding to a plurality of buried objects, wherein the EMI data is sufficiently robust to enable classification of a buried object in the plurality of buried objects as a known metallic object; and
a computer configured to:
extract shape parameters corresponding to the buried objects from the EMI data,
initiate a comparison of the shape parameters to a plurality of previously recorded signatures of known metallic objects, and
determine, based on the comparison, whether to classify the buried object in the plurality of buried objects as the known metallic object.

12. The sensor system of claim 11, wherein the computer is further configured to extract fit location parameters from the EMI data.

13. The sensor system of claim 11, wherein the EMI data is sufficiently robust to enable classification of the buried object as unexploded ordinance based on a comparison of shape parameters corresponding to the buried object to a signature of unexploded ordinance.

14. The sensor system of claim 11, wherein the sensor array comprises:
an array of transmitter coils for transmitting a series of excitation signals onto an area of interest.

15. The sensor system of claim 14, wherein the sensor array further comprises:
a three-axis receiver cube, positioned in the center of a transmitter coil in the array of transmitter coils.

16. The sensor system of claim 14, wherein the sensor array further comprises:
an array of five receiver cubes.

17. The sensor system of claim 11, wherein the sensor array comprises:
a transmitter coil;
a signal preamplifier;
a receiver coil; and
a foam core.

18. The sensor system of claim 11, wherein the system is configured to group decay measurements from the buried objects into a plurality of logarithmically spaced gates.

19. The sensor system of claim 11, wherein the system is configured to operate in a cued mode or in a dynamic mode.

20. The sensor system of claim 19, wherein the system is configured to group decay measurements from the buried objects into 122 logarithmically spaced gates in the cued mode, and wherein the system is configured to group the decay measurements into 19 gates in the dynamic mode.

* * * * *